(12) United States Patent  (10) Patent No.: US 8,132,975 B2
Tracy et al.                  (45) Date of Patent:     Mar. 13, 2012

(54) KEYBOARD STIFFENING SYSTEM

(75) Inventors: Mark S. Tracy, Tomball, TX (US);
Jonathan R. Harris, Cypress, TX (US);
Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 937 days.

(21) Appl. No.: 11/787,125

(22) Filed: Apr. 13, 2007

(65) Prior Publication Data
US 2008/0253821 A1    Oct. 16, 2008

(51) Int. Cl.
*B41J 5/00*      (2006.01)
(52) U.S. Cl. ........................................ 400/472; 400/693
(58) Field of Classification Search .................. 400/472, 400/693; 361/679.09, 679.17
See application file for complete search history.

(56) References Cited

U.S. PATENT DOCUMENTS

| 4,231,098 | A | * | 10/1980 | Tanimoto | 361/679.09 |
| 4,851,618 | A | * | 7/1989 | Amino et al. | 200/5 A |
| 5,428,502 | A | * | 6/1995 | Tsai | 361/679.08 |
| 5,483,418 | A | * | 1/1996 | Hosoi | 361/679.55 |
| 5,490,037 | A |   | 2/1996 | Clancy |  |
| 5,539,615 | A |   | 7/1996 | Sellers |  |
| 5,969,644 | A | * | 10/1999 | Koutaka | 341/22 |
| 6,437,972 | B1 |  | 8/2002 | Sellers |  |
| 6,729,783 | B2 |  | 5/2004 | Godsted et al. |  |
| 6,751,089 | B2 |  | 6/2004 | Hsieh |  |
| 2008/0144262 | A1 | * | 6/2008 | Lai | 361/680 |

FOREIGN PATENT DOCUMENTS

JP       11-265251 A  *  9/1999
* cited by examiner

*Primary Examiner* — Anthony Nguyen

(57) ABSTRACT

A keyboard stiffening system comprising a keyboard assembly having a plurality of key assemblies coupled to a support plate, the support plate having at least one extension extending from a bottom surface thereof to engage a support pan of the electronic device to secure the keyboard assembly to the support pan of the electronic device.

20 Claims, 3 Drawing Sheets

KEYBOARD STIFFENING SYSTEM

BACKGROUND

Electronic devices, such as laptop or notebook computers, comprise keyboards that are susceptible to bending and/or other deflecting movement as a result of a user depressing the keyboard keys. For example, when depressing keyboard keys on the central or inner portion of the keyboard, the keyboard tends to bend and/or deflect, which is undesirable and makes using the keyboard difficult.

DETAILED DESCRIPTION OF THE DRAWINGS

Figure 1:
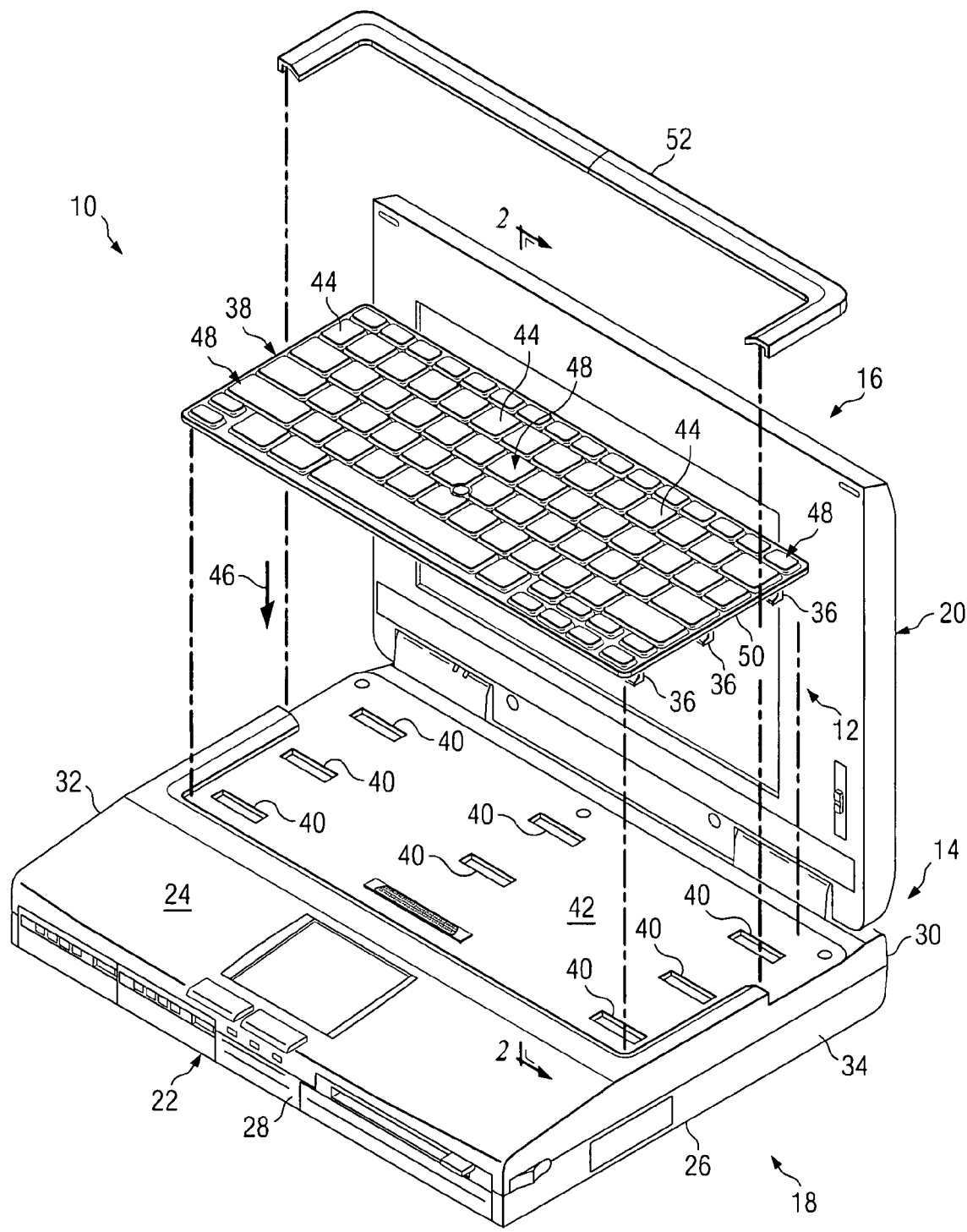
FIG. 1 is a diagram of a perspective view of an electronic device employing an embodiment of a keyboard stiffening system to advantage.
Figure 2A:
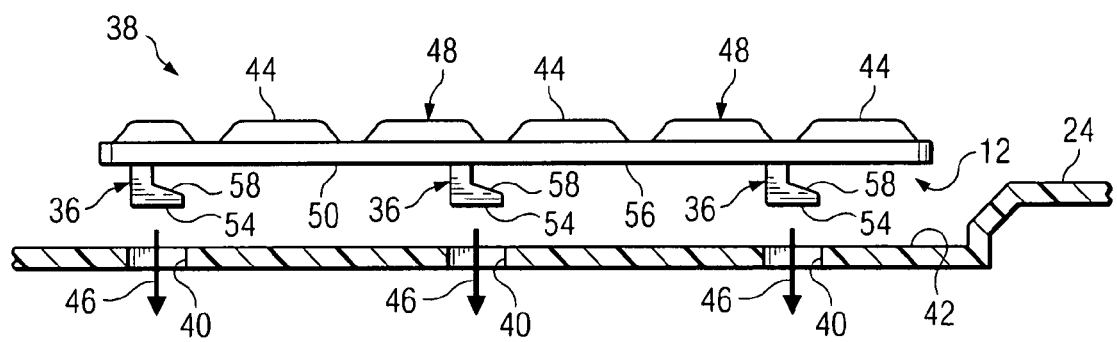
FIG. 2A is a diagram illustrating an exploded view of the keyboard stiffening system of FIG. 1 taken along the line 2-2 of FIG. 1.
Figure 2B:
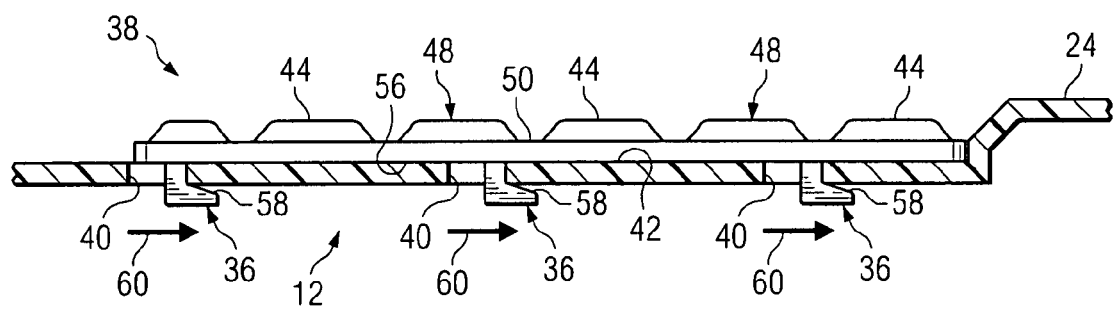
FIG. 2B is a diagram illustrating an assembled view of the keyboard stiffening system of FIG. 1 taken along the line 2-2 of FIG. 1.
Figure 3:
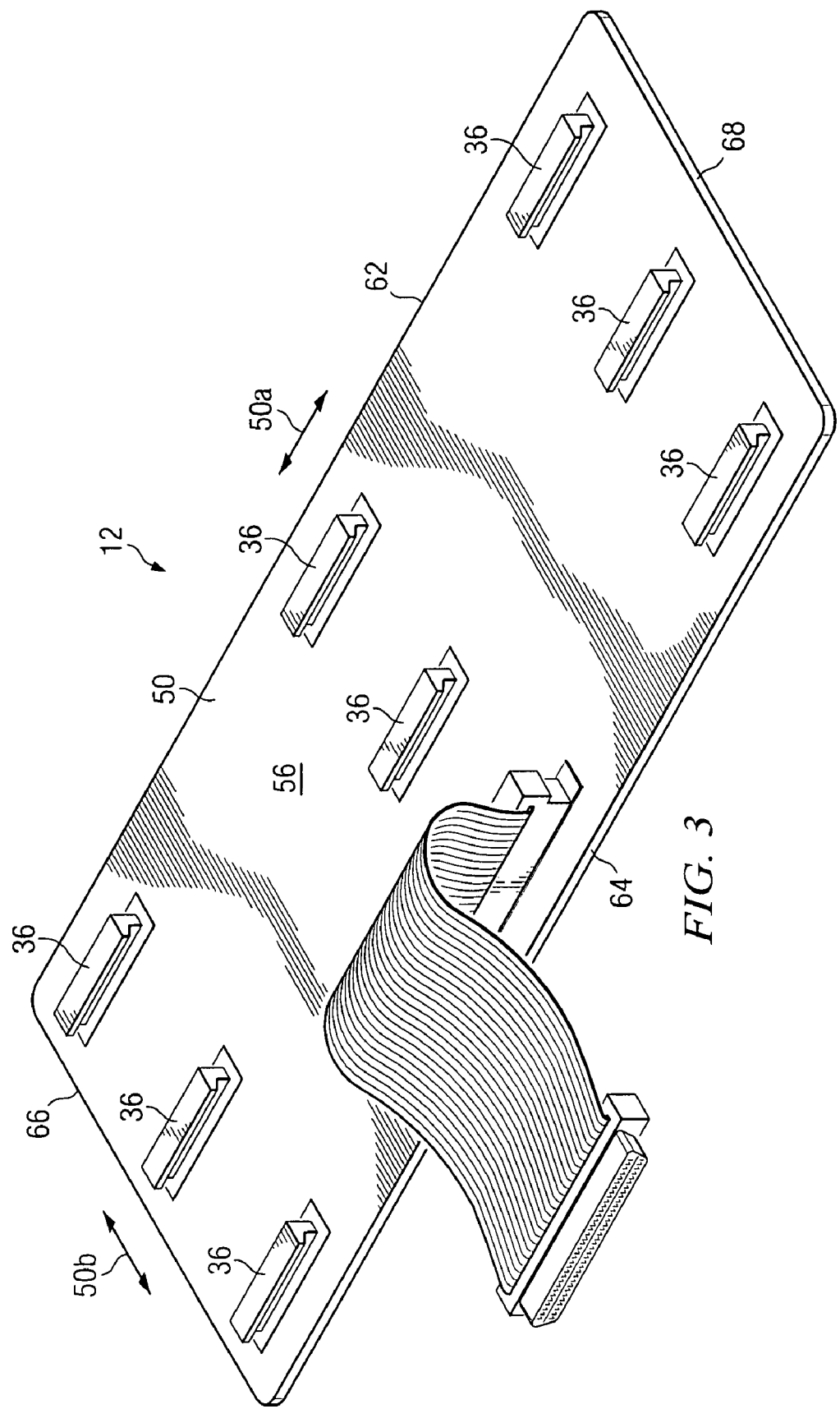
FIG. 3 is a diagram illustrating a bottom perspective view of the keyboard stiffening system of FIG. 1.

Various embodiments and the advantages thereof are best understood by referring to FIGS. 1-3 like numerals being used for like and corresponding parts of the various drawings.

FIG. 1 is a diagram of a perspective view of an electronic device 10 employing an embodiment of a keyboard stiffening system 12 to advantage. In the embodiment illustrated in FIG. 1, electronic device 10 comprises a laptop or notebook computer 14; however, it should be understood that electronic device 10 may comprise any type of computing device such as, but not limited to, a tablet personal computer, a personal digital assistant, a desktop computer, a gaming device, or any other type of portable or non-portable computing device. In the embodiment illustrated in FIG. 1, electronic device 10 comprises a display member 16 rotatably coupled to a base member 18. Display member 16 and base member 18 each comprise a housing 20 and 22, respectively, formed having a number of walls. For example, housing 22 comprises a top wall defining a working surface 24, a bottom wall 26, a front wall 28, a rear wall 30 and a pair of sidewalls 32 and 34.

In the embodiment illustrated in FIG. 1, keyboard stiffening system 12 comprises a plurality of extensions 36 extending from a keyboard assembly 38 that are insertible within a plurality of corresponding openings 40 disposed on a keyboard support pan 42. In operation, keyboard stiffening system 12 reduces and/or substantially eliminates bending and/or deflection of keyboard assembly 38 when a user depresses keycaps 44 of keyboard assembly 38 by securely fastening keyboard assembly 38 to keyboard support pan 42 and minimizing gaps between keyboard assembly 38 and keyboard support pan 42 to prevent and/or substantially eliminate relative movement between keyboard assembly 38 and support pan 42.

In the embodiment illustrated in FIG. 1, keyboard support pan 42 is disposed in electronic device 10 and is configured to support keyboard assembly 38 on housing 22. Keyboard support pan 42 is formed of a generally rigid material, such as a metal or plastic, so as to support keyboard assembly 38 with minimal or no deflection of support pan 42 resulting from use of keyboard assembly 38. In FIG. 1, keyboard assembly 38 comprises key assemblies 48 coupled to a support plate 50. In some embodiments, each key assembly 48 comprises a particular keycap 44 and a scissor/plunger mechanism for enabling upward/downward movement of the particular keycap 44 to facilitate keystroke input to an input membrane or other type of keystroke interface. According to some embodiments, support plate 50 is formed from a rigid material, such as a metal or plastic, and is configured to support keyboard assemblies 48 thereon. In the embodiment illustrated in FIG. 1, extensions 36 are integrally formed (e.g., formed as a single unitary body) with and extend outwardly from support plate 50 for engagement with corresponding openings 40 on keyboard support pan 42. Alternatively, extensions 36 may be coupled to support plate 50 via an adhesive, bonding, welding or other method. During installation of keyboard assembly 38 in electronic device 10, extensions 36 are aligned with openings 40 and keyboard assembly 38 is moved in the direction indicated by arrow 46 to insert extensions 36 into openings 40 to secure keyboard assembly 38 to housing 22. According to some embodiments, extensions 36 frictionally engage openings 40 of keyboard support pan 42 to securely fasten keyboard assembly 38 to keyboard support pan 42 to prevent and/or substantially reduce relative movement between keyboard assembly 38 and keyboard pan 42. In some embodiments, a bezel 52 overlays at least a portion of keyboard assembly 38 and is coupled to housing 22 to prevent removal of keyboard assembly 38 from electronic device 10.

FIG. 2A is a diagram illustrating an exploded view of keyboard stiffening system 12 of FIG. 1 taken along the line 2-2 of FIG. 1. FIG. 2B is a diagram illustrating an assembled view of keyboard stiffening system 12 of FIG. 1 taken along the line 2-2 of FIG. 1. In the embodiment illustrated in FIGS. 2A and 2B, extensions 36 comprise a plurality of hooks 54 extending outwardly and/or downwardly from a bottom surface 56 of support plate 50. Hooks 54 are configured to be insertible into corresponding openings 40 to secure keyboard assembly 38 to keyboard support pan 42. In FIGS. 2A and 2B, each of hooks 54 comprise a sloped surface 58 such that after hooks 54 are inserted within openings 40 and keyboard assembly 38 is moved in the direction of arrow 60 (FIG. 2B), sloped surfaces 58 of each hook 54 frictionally engage keyboard support pan 42 to clamp keyboard assembly 38 to keyboard support pan 42 and substantially prevent separation of keyboard assembly 38 from keyboard support pan 42. For example, in the embodiment illustrated in FIGS. 2A and 2B, in response to movement of keyboard assembly 38 in the direction of arrow 60, sloped surfaces 58 cause keyboard assembly 38 to be clamped against keyboard support pan 42 to minimize any potential gaps and relative movement between keyboard support pan 42 and support plate 50. Accordingly, potential bending and/or deflection of keyboard assembly 38 in the direction of arrow 46 (FIG. 2A) is substantially minimized and/or eliminated.

FIG. 3 is a diagram illustrating a bottom perspective view of keyboard stiffening system 12 of FIG. 1. In the embodiment illustrated in FIG. 3, extensions 36 are spaced apart on bottom surface 56 in lateral and longitudinal directions of support plate 50, as indicated by arrows 50a and 50b, respectively, to minimize and/or substantially eliminate gaps between support plate 50 and keyboard support pan 42. In FIG. 1, extensions 36 are evenly spaced apart across bottom surface 56 of support plate 50 (e.g., evenly spaced apart across bottom surface 56 between a front edge 62, a rear edge 64 and a pair of side edges 66 and 68 of support plate 50); however, it should be understood that extensions 36 may be otherwise disposed and/or located. For example, in some embodiments, extensions 36 may be disposed on the central portion of keyboard support plate 50 in addition to or in lieu of extensions 36 being disposed around the periphery of support plate 50. Further, one or more extensions 36 may extend along an entire length and/or width (or substantially along the entire length or width) of support plate 50 (e.g., extending across or substantially across the entire length of support plate 50 between side edges 66 and 68 and/or across or substantially across the entire width of support plate 50 between front edge 62 and rear edge 64).

Thus embodiments of a keyboard stiffening system 12 minimize and/or eliminate bending or deflection of keyboard assembly 38 that may otherwise result by a user utilizing keyboard assembly 38 by eliminating and/or substantially reducing gaps between keyboard support pan 42 and support plate 50.

What is claimed is:

1. A keyboard stiffening system comprising:
   a keyboard assembly having a plurality of key assemblies coupled to a support plate, the support plate having at least one extension extending from an interior of a bottom surface thereof to engage a support pan of an electronic device to secure the keyboard assembly to the support pan of the electronic device.

2. The system of claim 1, wherein the at least one extension comprises at least one hook.

3. The system of claim 1, wherein the extension comprises a sloped surface to frictionally engage the support pan.

4. The system of claim 1, wherein the support pan comprises at least one opening to receive the at least one extension.

5. The system of claim 1, wherein the at least one extension comprises a sloped surface to frictionally engage the support pan to clamp the keyboard assembly to the support pan to restrain deflection of the secured keyboard assembly when a user depresses a key assembly of the plurality of key assemblies.

6. The system of claim 1, wherein the at least one extension comprises a plurality of extensions spaced apart across a length of the keyboard assembly.

7. The system of claim 1, wherein the at least one extension is configured to clamp the support plate to the support pan.

8. The system of claim 1, wherein movement of the keyboard assembly relative to the support pan causes the at least one extension to clamp the keyboard assembly to the support pan.

9. A method of manufacturing a keyboard stiffening system, the method comprising:
   providing a keyboard assembly having a plurality of key assemblies coupled to a support plate; and
   providing at least one extension extending from a central area of a bottom surface of the support plate to engage a support pan of an electronic device to secure the keyboard assembly to the support pan of the electronic device.

10. The method of claim 9, wherein providing the at least one extension comprises providing at least one hook.

11. The method of claim 9, further comprising providing a sloped surface on the at least one extension to frictionally engage the support pan.

12. The method of claim 9, further comprising providing the support pan, and wherein the support pan comprises at least one opening to receive the at least one extension.

13. The method of claim 9, further comprising providing the at least one extension to frictionally engage the support pan to clamp the keyboard assembly to the support pan to restrain deflection of the secured keyboard assembly when a user depresses a key assembly of the plurality of key assemblies.

14. The method of claim 9, wherein providing the at least one extension comprises providing a plurality of extensions spaced apart on the support plate across a length of the keyboard assembly.

15. The method of claim 9, further comprising configuring the at least one extension to clamp the keyboard assembly to the support pan.

16. The method of claim 9, further comprising configuring the at least one extension such that movement of the keyboard assembly relative to the support pan causes the at least one extension to clamp the keyboard assembly to the support pan.

17. The system of claim 1, wherein:
   the at least one extension comprises a plurality of extensions spaced across a length of the bottom surface;
   the support pan comprises a plurality of openings to respectively receive the plurality of extensions;
   each of the plurality of extensions comprises a sloped surface to frictionally engage the support pan via the plurality of openings to clamp the support plate to the support pan, wherein movement of the keyboard assembly relative to the support pan causes the plurality of extensions to clamp the keyboard assembly to the support pan.

18. The method of claim 14, comprising providing a sloped surface on each of the plurality of extensions to frictionally engage the support pan via a respective plurality of openings of the support pan to clamp the keyboard assembly to the support pan, wherein movement of the keyboard assembly relative to the support pan causes the plurality of extensions to clamp the keyboard assembly to the support pan.

19. An electronic device comprising:
   a support pan for a keyboard, the support pan comprising an upper surface to receive the keyboard, wherein the upper surface comprises openings spaced across the support pan, and wherein at least one of the openings is disposed in an interior area of the upper surface; and
   a keyboard comprising keys coupled to a support plate, the support plate comprising extensions spaced across a bottom surface of the support plate and inserted respectively into the openings and clamping the keyboard to the support pan, wherein each extension comprises a sloped surface frictionally engaged with the support pan via the respective openings, and wherein movement of the keyboard parallel to the upper surface of the support pan causes the plurality of extensions to clamp the keyboard to the support pan.

20. The electronic device of claim 19, wherein the support pan comprises a substantially rigid material, and wherein the extensions clamping the keyboard to the support pan provides stiffens the keyboard, and restrains deflection of the keyboard when a user depresses the keys.

\* \* \* \* \*